United States Patent [19]

Black et al.

[11] 4,124,886
[45] Nov. 7, 1978

[54] GENERATION OF LOW FREQUENCY, HIGH VOLTAGES

[75] Inventors: Ian A. Black, Worthing; Rodney Miller, St. Leonards-On-Sea, both of England

[73] Assignee: Counting Instruments Limited, Boreham Wood, England

[21] Appl. No.: 767,733

[22] Filed: Feb. 11, 1977

Related U.S. Application Data

[63] Continuation-in-part of Ser. No. 590,710, Jun. 26, 1975, abandoned.

[30] Foreign Application Priority Data

Jul. 3, 1974 [GB] United Kingdom ............... 29498/74

[51] Int. Cl.² .......................................... H02M 7/53
[52] U.S. Cl. ..................................... 363/121; 307/77; 307/261; 323/21; 323/23; 330/59
[58] Field of Search ........................ 307/54, 61, 63, 77, 307/87, 261, 262, 268; 323/21, 23, 25; 363/121, 29, 31, 63, 65, 69, 111, 120, 122, 131; 328/14, 21; 330/59, 308

[56] References Cited
U.S. PATENT DOCUMENTS

| | | | |
|---|---|---|---|
| 3,283,237 | 11/1966 | Williams et al. | 363/120 |
| 3,524,986 | 8/1970 | Harnden | 323/21 UX |
| 3,772,606 | 11/1973 | Waehner | 323/23 UX |
| 4,027,228 | 5/1977 | Collins | 323/21 |

*Primary Examiner*—A. D. Pellinen
*Attorney, Agent, or Firm*—Kenyon & Kenyon, Reilly, Carr & Chapin

[57] ABSTRACT

A circuit arrangement for applying low frequency high voltage waveforms across a load and which includes low and high voltage circuits. The low voltage circuit includes a sinusoidal signal generator for producing a low voltage electrical waveform, and a transmitter circuit having first and second light emitting diode circuits by which first and second light signals are generated which are transmitted to the high voltage circuit by respective fibre optic light guides. The high voltage circuit includes first and second high voltage d.c. supplies and first and second triode valves. Grid modulation devices are associated with the first and second triode valves and are respectively responsive to the first and second light signals transmitted via the fibre optic light guides for varying the current through said first and second triode valves and the load in direct proportion to the positive and negative variations of said low voltage electrical waveform to thereby reproduce the positive and negative variations of the low voltage waveform at high voltage across the load.

8 Claims, 3 Drawing Figures

GENERATION OF LOW FREQUENCY, HIGH VOLTAGES

This Application is a continuation-in-part of Serial No. 590,710 filed on the June 26, 1975, now abandoned.

BACKGROUND OF THE INVENTION

The present invention relates to the generation of high voltages and is particularly concerned with the generation of low frequency, high voltages for insulation test purposes.

Low-frequency, high voltage testing of component and machine insulation has been widely used since the basic technique was suggested some 15 years ago. Its principal advantage is that, when testing highly capacitive components, the size of the power supply is much reduced as compared with that required for conventional power frequency test purposes. The tests usually associated with this technique are either simple overpotential tests where the machine or component under test is subjected to very high potentials to check for insulation breakdown, or so-called partial discharge tests which are designed to detect internal discharges which do not actually bridge the electrodes of the component or machine, for example, discharges in cavities in a dielectric, surface discharges along an insulator, and corona discharges around a sharp edge.

The generators at present available for producing such low frequency, high voltages are large, cumbersome and not easily transportable. They have all incorporated some form of mechanical device which has been used either to modulate a fixed frequency signal or to reverse the polarity of a modulated signal. Such generators have therefore had the often severe disadvantages of being mechanically and electrically noisy and also of requiring frequent mechanical maintenance. Furthermore, the generation of electrical noise as a result of the use of such mechanical devices has been found to render the known generators rather unsuitable for discharge detection tests since the latter require clean test signals in order to provide reliable test information.

Further disadvantages of the known generators are that they usually operate either at a fixed frequency or over a very limited frequency range up to a maximum of approximately 5 Hz., and, because of the presence of mechanically operating devices, often produce an output signal which is distorted in the cross-over regions near zero voltage.

SUMMARY OF THE INVENTION

An object of the present invention is to provide a low frequency, high voltage generator which gives a substantially noise-free output voltage operable over a wide frequency range and is capable of being constructed in an easily portable form.

In accordance with the present invention there is provided a circuit arrangement for applying low frequency high voltage waveforms across a load comprising a low voltage circuit having a signal generator for producing a low voltage electrical waveform, and a transmitter circuit having a first light emitting diode circuit means linearly responsive to positive portions of the low voltage electrical waveform for producing a first light signal, the light intensity of the first light signal being proportional to the positive variations of the low voltage electrical waveform, and a second light emitting diode circuit means responsive to negative portions of the low voltage electrical waveform for producing a second light signal, the light intensity of the second light signal being proportional to the negative variations of the low voltage electrical waveform. First and second light transmission means transmit the first and second light signals. The circuit arrangement also includes a high voltage circuit having first and second high voltage d.c. supply means, a first electronic control device connectible in series with the load and the first high voltage d.c. supply means such that current may flow in a first direction through the load, and a second electronic control device connectible in series with the load and the second source of high voltage d.c. supply such that current may flow in a second direction through the load, the second direction being opposite to the first direction. The first electronic control device has an electronic control element means responsive to the first light signal transmitted from the first transmission means for varying the current through the first electronic control device and the load in direct proportion to the positive variations of the low voltage electrical waveform thereby repeating at a positive high voltage across the load the positive variations of the low voltage waveform, and the second electronic control device has an electronic control element means responsive to the second light signal transmitted from the second transmission means for varying the current through the second electronic control device and the load in the second direction opposite to the first direction, in direct proportion to the negative variations of the low voltage electrical waveform, thereby repeating at a negative high voltage across the load the negative variations of the low voltage waveform.

The use of the first and second electronic control devices, which are preferably thermionic triode valves, in this manner obviates the necessity to include a mechanical device for modulating the d.c. supply and hence enables an output waveform to be achieved which has considerably less associated electrical noise than hitherto. The present circuit is also very much more flexible than the known arrangements and can produce output waveforms over a wide frequency range, for example, 0.001 Hz to 100 Hz.

The use of the fibre optic light guides to electrically isolate a low voltage control circuit from a controlled circuit operating a high voltage is not in itself new, see for example, U.S. Pat. No. 3,524,986, but provides a convenient safety precaution in the present situation where very high voltages are being handled.

Electronic control devices other than thermionic triode valves can of course be used, although triodes have the practical advantages of cheapness, ready availability and high voltage and current operating capability.

BRIEF DESCRIPTION OF THE DRAWINGS

The invention is described further hereinafter, by way of example, with reference to the accompanying drawings, in which.

DESCRIPTION OF THE PREFERRED EMBODIMENTS

Figure 1:
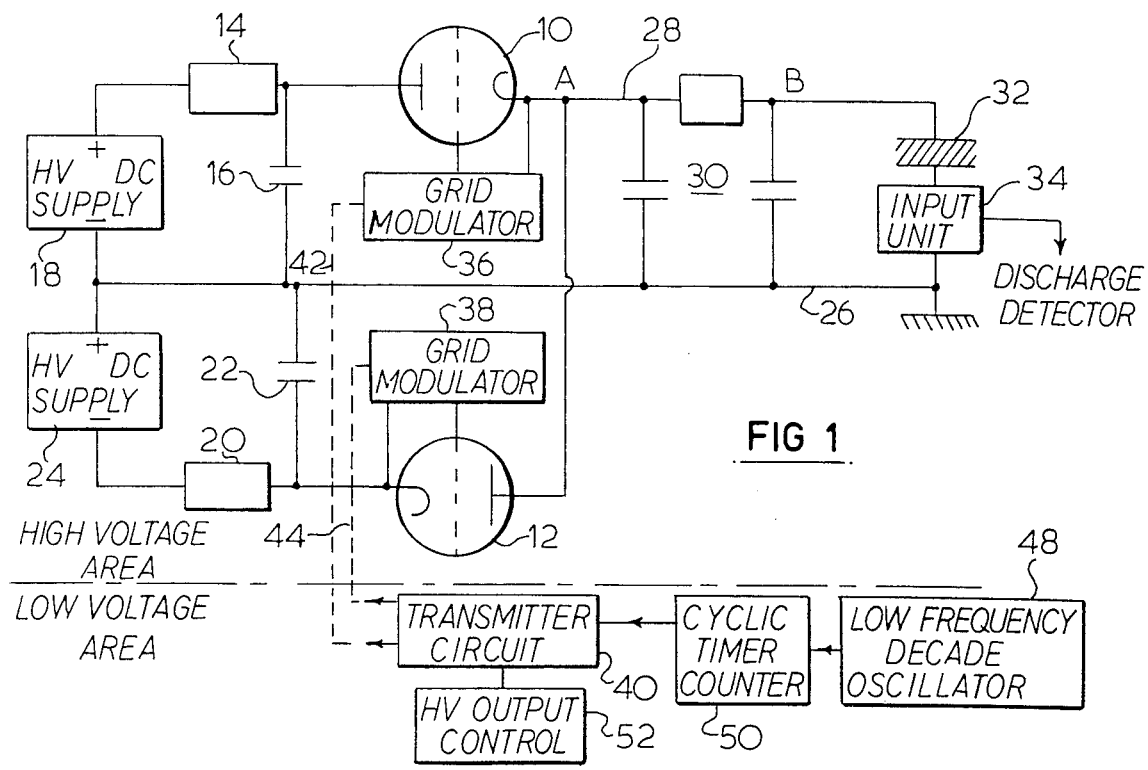
FIG. 1 is a schematic circuit diagram of one embodiment of a low-frequency, high voltage generator in accordance with the present invention.

The generator of FIG. 1 includes two high voltage triode valves 10,12 which are used as series regulators, the anode of the valve 10 being connected via a storage and filter network 14,16 to the positive terminal of a first high voltage d.c. supply 18 and the cathode of the valve 12 being connected via a second storage and filter network 20,22 to the negative terminal of a second high voltage d.c. supply 24. The negative terminal of the d.c. supply 18 and the positive terminal of the d.c. supply 24 are both connected to an earthed line 26. By virtue of this arrangement, the d.c. supplies 18,24 apply voltages to the valves 10 and 12 which are positive and negative relative to earth, respectively. The cathode of the valve 10 and the anode of the valve 12 are connected to an output line 28 of the generator.

For over-potential tests, the output of the generator can be taken directly from point A on the line 28 to one side of a test sample whose other side is connected to earth. However, particularly when using the generator for partial discharge detection tests, it is preferable to incorporate a $\pi$ filter 30 to attenuate noise from the valves 10,12 and to remove transients and other disturbances. In this case, therefore, the output is taken from point B to the test sample 32 which has a discharge detector input unit 34 in series with it. Additional detail of one such technique for detecting partial discharge is described in U.S. Pat. No. 3,882,380 (Black). For all such tests, the output voltage of the generator can be measured and monitored by connecting a high impedance potential divider (not shown) across the appropriate output in a conventional manner.

In order to produce the required senusoidal waveform at the output A or B, grid modulator circuits 36,38 are associated with the valves 10,12 for modulating the currents supplied to the line 28 by the d.c. supplies 18,24. For a sinusoidal waveform, the positive and negative half cycles of the waveform are controlled by the valves 10 and 12, respectively. The grid modulator circuits 36,38, which are maintained at the valve cathode potentials, are controlled by a transmitter circuit 40 operated at ground potential, the control signals between the low and high voltage circuits 40 and 36,38 being transmitted by fibre optic light guides 42,44 whereby, except when feedback is provided as described below, there is complete electrical isolation between the low and high voltage circuits.

The low voltage transmitter circuit 40 is itself controlled by a suitable sinusoidal function generator. The function generator can for example comprise a low frequency decade oscillator 48 generating a signal in the frequency range 0.001–100 Hz which is fed to a cyclic timer 50 enabling the number of cycles applied to the test sample in a given test to be selected in the range, say, 2–2500. Control of the magnitude of the generator output voltage is obtained by varying the magnitude of the modulating signal by means of a control circuit 52, which can be a simple potentiometer.

Figure 2:
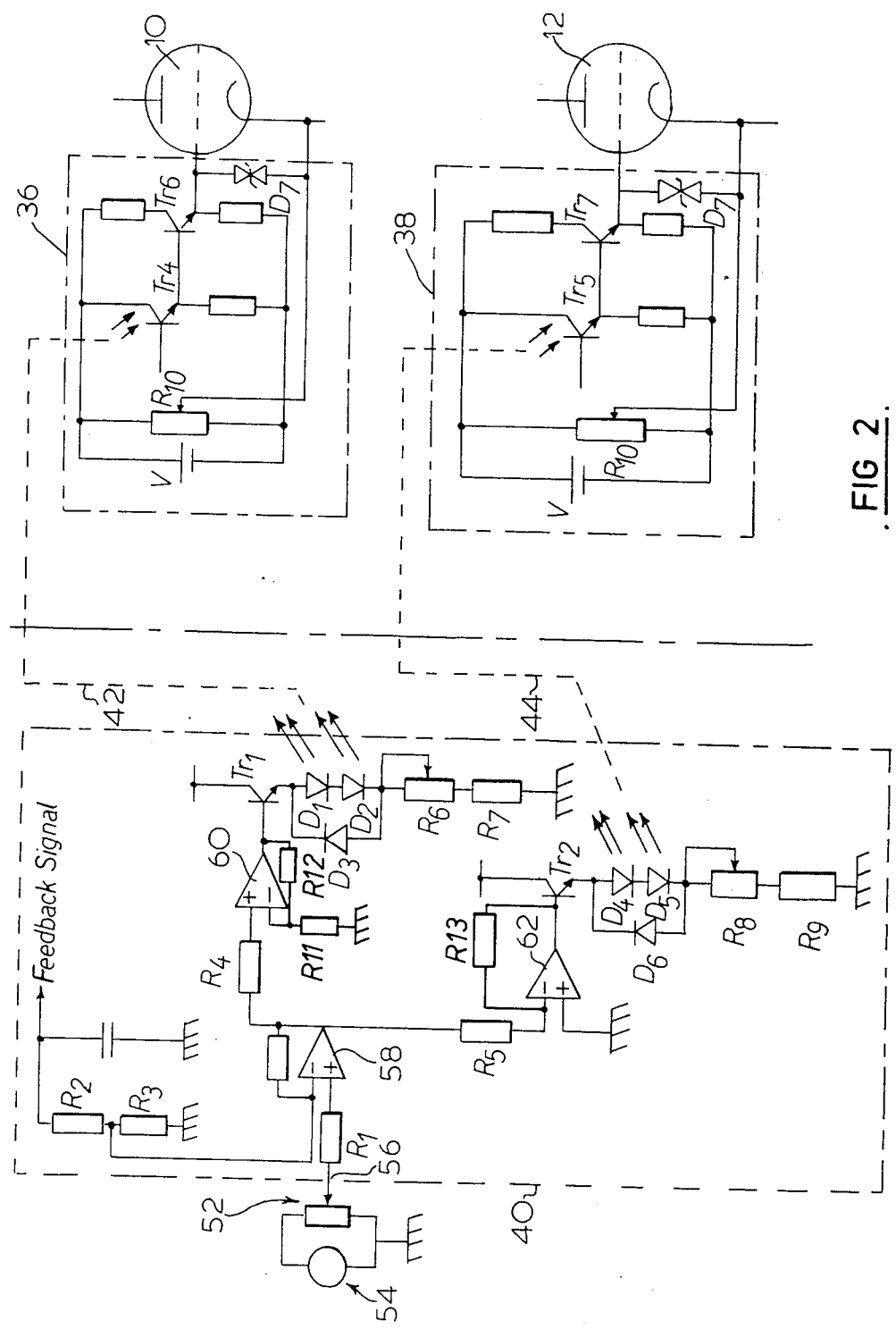
FIG. 2 is a schematic circuit diagram illustrating in more detail the transmitter and grid modulator circuits of the embodiment of FIG. 1.

The manner in which the modulating signals for the valves 10,12 are formed and transmitted between the low and high voltage circuits is illustrated in more detail in FIG. 2 which shows the valves 10,12 and their grid modulating circuits 36,38, the transmitter circuit 40, the output control 52 and a function generator 54. The remainder of the generator is as shown in FIG. 1. The function generator produces a sinusoidal signal, the magnitude of which can be varied by a potentiometer serving as the output control 52. A sinusoidal input signal is thus applied to the input line 56 of the transmitter 40.

The input sinusoid on line 56 is applied to the non-inverting input of an operational amplifier 58 via a resistor $R_1$, bias for the amplifier 58 being provided by a potential divider $R_2$, $R_3$ optionally coupled to a feedback signal corresponding to the actual output signal of the generator. For example, the feedback signal can be derived from a 1000:1 potential divider (not shown in FIG. 1 but see FIG. 3) connected to the generator output. The sinusoidal output of the amplifier 58 is applied to the non-inverting input of an operational amplifier 60 via a resistor $R_4$ and to the inverting input of an operational amplifier 62 via a resistor $R_5$. The other input of the amplifier 60 is connected to earth via a resistor $R_{11}$ and the input of amplifier 62 is connected directly to earth. The sinusoidal output of the amplifier 60 is thus identical in phase to the original signal at its input whereas the output sinusoid of the amplifier 62 is inverted relative to its input and thus effectively phase displaced by 180°. Feedback for the amplifiers 60,62 is provided by feedback resistors $R_{12}$, $R_{13}$ respectively.

The output of the amplifier 60 is coupled to the base of an emitter-follower transistor $Tr_1$ whose emitter circuit includes the series combination of a pair of light emitting diodes $D_1$, $D_2$, a potentiometer $R_6$ and a resistor $R_7$. A reverse biassed diode $D_3$ is located in parallel with the diodes $D_1$, $D_2$. Thus, during the positive half cycles of the sinusoidal input signal at the base of $Tr_1$, the light emitting diodes $D_1$, $D_2$ conduct and emit light of intensity corresponding to the instantaneous magnitude of the positive half cycle current. Although two series diodes $D_1$, $D_2$ have been included in this embodiment for producing the light output, a single such diode or more than two such series diodes can alternatively be used in dependence upon the number of stages in the high voltage circuit which are to be controlled. Thus, for example, to control the positive half cycles in the high voltage circuit of FIG. 1 only one of these diodes, e.g. $D_1$, and one light guide 42 are necessary.

In a similar manner, the output of the amplifier 62 is coupled to the base of a further emitter-follower transistor $Tr_2$ whose emitter circuit includes the series combination of a pair of light emitting diodes $D_4$, $D_5$, a potentiometer $R_8$ and a resistor $R_9$. A reverse biased diode $D_6$ is located in parallel with the diodes $D_4$, $D_5$. During the positive half cycles of the sinusoidal input signal at the base of $Tr_2$, the light emitting diodes $D_4$, $D_5$ conduct and emit light of intensity corresponding to the instantaneous magnitude of the positive half cycle current. Similar remarks as were made concerning the diodes $D_1$ and $D_2$ apply to the diodes $D_4$ and $D_5$.

Since, because of the inversion at the amplifier 62, the positive half cycles of the input signal applied to $Tr_2$ correspond to the negative half cycles of the original sinusoidal waveform at the amplifier 58, the diodes $D_4$, $D_5$ provide light signals of intensity corresponding to the instantaneous magnitude of such negative half cycles, the diodes $D_1$, $D_2$ providing light signals of intensity corresponding to the instantaneous magnitude of the positive half cycles.

Emitter follower circuits are chosen for driving the light emitting diodes $D_1$ $D_2$ $D_4$ $D_5$ in order to provide sufficient current. The purpose of the operational amplifiers 60,62 is to act as buffers and prevent loading of the amplifier 58. In addition, as described above, the amplifier 62 also has the function of inverting its signal input.

The signals from the diodes $D_1$, $D_2$ and from the diodes $D_4$, $D_5$ are transmitted by the fibre optic light guides 42,44 to phototransistors $Tr_4$, $Tr_5$ in the grid modulator circuits 36,38, respectively. In each case, the phototransistors $Tr_4$ or $Tr_5$ are connected as emitter-followers to amplifying transistors $Tr_6$, $Tr_7$ whose outputs are applied to the grids of the triode valves 10,12, respectively. In this embodiment, each circuit 36,38 includes a separate power supply V and a potentiometer $R_{10}$ whose wiper is connected to the cathode of the associated triode. A respective zener diode $D_7$ connects the grid and cathode of each triode.

Thus, the grid modulating circuits serve to modulate the grids of their associated triodes in proportion to the instantaneous magnitude of the light signals transmitted by the guides 42,44 and hence in proportion to the instantaneous magnitude of the positive and negative half cycles of the original signal provided by the function generator 54. The output current of the generator on line 28 is thus modulated in accordance with the signal of the waveform generator, as required. Although not always essential, the feedback from the voltage divider to the low frequency function generator ensures particular accuracy of the output waveform.

In the presently described embodiment, whilst the power supplies 18,24 can provide the mean current, the storage capacitors 16,22 of the storage and filter networks are used to supply the peak current, this arrangement enabling the size of the power supplies to be reduced. These storage capacitors also have the additional advantage of attenuating any noise on the D.C. supplies 18,24.

Although described above in relation to sinusoidal signals, unlike the initially described electromechanical systems of the prior art, the present system may be used to generate not only sine waves having positive and negative going portions but also many other waveforms, such as saw-tooth, triangular or even d.c. These waveforms may be generated over a wide range of frequency, for example from 0.001 Hz to 100 Hz, enabling comparison tests to be made over the most significant frequency spread.

Figure 3:
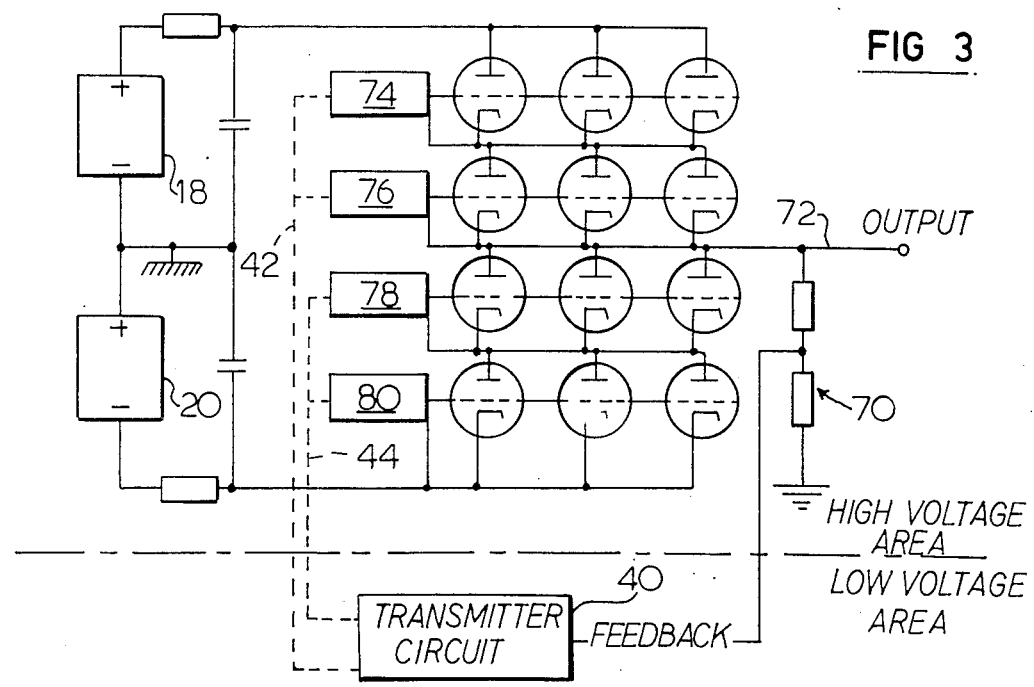
FIG. 3 is a schematic circuit diagram of a second embodiment of a low-frequency, high voltage generator in accordance with the present invention.

The single stage embodiment described above has an output of, say, 10 kv peak over the stated frequency range. Higher voltages and operating voltages can be generated by using a series-parallel combination of valves as shown in FIG. 3 and higher rated d.c. power supplies. The embodiment of FIG. 3 is basically similar to that of FIG. 1 in that it includes high voltage d.c. supplies 18 and 20, a transmitter circuit 40 and a function generator (not shown). Feedback from a potential divider 70 across the output is supplied to the transmitter 40 to ensure accuracy of the output waveform, this being more essential in this embodiment than in that of FIG. 1. Four sets of parallel connected triodes are connected in series between the positive terminal of one d.c. supply and the negative terminal of the other d.c. supply, the connection between the second and third sets of valves forming an output line 72. A respective grid modulating circuit 74, 76, 78, 80 is associated with each one of the sets of parallel triodes, the modulating circuits 74,76 being coupled to the transmitter circuit 40 by the fibre optic light guide 42 and the modulating circuits 78,80 being coupled by the fibre optic light guide 44. The operation of the embodiment of FIG. 3 is the same as that of FIG. 1, the voltage being distributed substantially equally across the valves.

We claim:
1. A circuit arrangement for applying low frequency high voltage sinusoidal waveforms across a load comprising,
  (a) a low voltage circuit having
    (i) a sinusoidal signal generator for producing a low voltage sinusoidal electrical waveform, and
    (ii) a transmitter circuit having a first light emitting circuit means linearly responsive to positive portions of said low voltage sinusoidal electrical waveform for producing a first light signal, the light intensity of said first light signal being proportional to the positive variations of said low voltage sinusoidal electrical waveform, and a second light emitting circuit means responsive to negative portions of said low voltage sinusoidal electrical waveform for producing a second light signal, the light intensity of said second light signal being proportional to negative variations of said low voltage sinusoidal electrical waveform,
  (b) first and second light transmission means for transmitting said first and second light signals, and
  (c) a high voltage circuit having
    (i) first and second high voltage d.c. supply means,
    (ii) a first electronic control device connected in series with said load and said first high voltage d.c. supply means such that current may flow in a first direction through said load,
    (iii) a second electronic control device connected in series with said load and said second source of high voltage d.c. supply such that current may flow in a second direction through said load, said second direction being opposite from said first direction, said first electronic control device having an electronic control element means responsive to said first light signal transmitted from said first transmission means for varying the current through said first electronic control device and said load in direct proportion to the positive variations of said low voltage sinusoidal electrical waveform thereby reproducing at a positive high voltage across said load the positive variations of said low voltage sinusoidal waveform, and said second electronic control device having an electronic control element means responsive to said second light signal transmitted from said second transmission means for varying the current through said second electronic control device and said load in said second direction opposite from said first direction, in direct proportion to the negative variations of said low voltage sinusoidal electrical waveform thereby reproducing at a negative high voltage across said load the negative variations of said low voltage sinusoidal waveform.

2. A circuit arrangement according to claim 1 in which said transmitter circuit includes first operational amplifier means, first light emitting diode means coupled to the output of said first operational amplifier means, and diode means connected in shunt with said first light emitting diode means, said low voltage sinusoidal electrical waveform being supplied to the non-inverting input of said first operational amplifier means whereby said first light emitting diode means carries a current corresponding to positive variations of said low voltage sinusoidal electrical waveform, and said transmitter circuit including second operational amplifier means, second light emitting diode means coupled to the output of said second operational amplifier means, and diode means connected in shunt with said second light emitting diode means, said low voltage sinusoidal electrical waveform being coupled to the inverting input of said second operational amplifier means whereby said second light emitting diode means carries a current corresponding to negative variations of said low voltage sinusoidal electrical waveform.

3. A circuit arrangement according to claim 1 including feedback circuit means coupling a preselected proportion of the electrical output signal applied to the load to the input of the transmitter circuit such as to ensure that the output waveform applied to the load accurately follows that of the low voltage sinusoidal electrical waveform produced by said signal generator.

4. A circuit arrangement according to claim 2 including a further operational amplifier means connected between said signal generator and said first and second operational amplifier means, said signal generator being coupled to the non-inverting input of said further operational amplifier means, and feedback circuit means coupling a preselected proportion of the electrical output signal applied to the load to the inverting input of said further operational amplifier means such as to ensure that the output waveform applied to the load accurately follows that of the low voltage sinusoidal electrical waveform produced by said signal generator.

5. A circuit arrangement for applying low frequency high voltage sinusoidal waveforms across a load comprising,
   (a) a low voltage circuit having
      (i) a sinusoidal signal generator for producing a low voltage sinusoidal electrical waveform, and
      (ii) a transmitter circuit having a first light emitting diode circuit means linearly responsive to positive portions of said low voltage sinusoidal electrical waveform for producing a first light signal, the light intensity of said first light signal being proportional to the positive variations of said low voltage sinusoidal electrical waveform, and a second light emitting diode circuit means responsive to negative portions of said low voltage sinusoidal electrical waveform for producing a second light signal, the light intensity of said second light signal being proportional to the negative variations of said low voltage sinusoidal electrical waveform,
   (b) first and second fibre optic light transmission means for transmitting said first and second light signals, and
   (c) a high voltage circuit having
      (i) first and second high voltage d.c. supply means,
      (ii) a first thermionic triode valve connected in series with said load and said first high voltage d.c. supply means such that current may flow in a first direction through said load,
      (iii) a second thermionic triode valve connected in series with said load and said second source of high voltage d.c. supply such that current may flow in a second direction through said load, said second direction being opposite from said first direction,
      (iv) first grid modulating means connected to the grid of said first triode valve and responsive to said first light signal transmitted from said first transmission means for varying the current through said first triode valve and said load in direct proportion to the positive variations of said low voltage sinusoidal electrical waveform thereby reproducing at a positive high voltage across said load the positive variations of said low voltage sinusoidal waveform, and
      (v) second grid modulating means connected to the grid of said second triode valve and responsive to said second light signal transmitted from said second transmission means for varying the current through said second triode valve and said load in said second direction opposite from said first direction, in direct proportion to the negative variations of said low voltage sinusoidal electrical waveform thereby reproducing at a negative high voltage across said load the negative variations of said low voltage sinusoidal waveform.

6. A circuit arrangement for applying low frequency high voltage waveforms across a load comprising,
   (a) a low voltage circuit having
      (i) a sinusoidal signal generator for producing a low voltage sinusoidal electrical waveform, and
      (ii) a transmitter circuit having a first light emitting diode circuit means linearly responsive to positive portions of said low voltage sinusoidal electrical waveform for producing a first light signal, the light intensity of said first light signal being proportional to the positive variations of said low voltage sinusoidal electrical waveform, and a second light emitting diode circuit means responsive to negative portions of said low voltage sinusoidal electrical waveform for producing a second light signal, the light intensity of said second light signal being proportional to the negative variations of said low voltage sinusoidal electrical waveform,
   (b) first and second light transmission means for transmitting said first and second light signals, and
   (c) a high voltage circuit having
      (i) first and second high voltage d.c. supply means,
      (ii) a first electronic control device connected in series with said load and said first high voltage d.c. supply means such that current may flow in a first direction through said load, said first electronic control device comprising a first plurality of parallel circuit branches each of which contains at least two series connected thermionic triode valves,
      (iii) a second electronic control device connected in series with said load and said second source of high voltage d.c. supply such that current may flow in a second direction through said load, said second direction being opposite from said first direction, said second electronic control device comprising a second plurality of parallel circuit branches each of which contains at least two series connected thermionic triode valves,
      (iv) first grid modulating means connected to the grids of the triode valves of said first electronic control device and responsive to said first light signal transmitted from said first transmission means for varying the current through said triode valves of the first electronic control device and said load in direct proportion to the positive variations of said low voltage sinusoidal electrical waveform thereby reproducing at a positive high voltage across said load the positive variations of said low voltage sinusoidal waveform, and (v) second grid modulatng means connected to the grids of the triode valves of said second electronic control device and responsive to said second light signal transmitted from said second transmission means for varying the current through said triode valves of said second electronic control device and said load in said second direction opposite from said first direction, in direct proportion to the negative variations of said low voltage sinusoidal electrical waveform thereby reproducing at a negative high voltage across said load the negative variations of said low voltage sinusoidal waveform.

7. A circuit arrangement for applying low frequency high voltage waveforms across a load comprising,
(a) a low voltage circuit having
(i) a signal generator for producing a low voltage electrical waveform, and
(ii) a transmitter circuit having a first light emitting circuit means linearly responsive to positive portions of said low voltage electrical waveform for producing a first light signal, the light intensity of said first light signal being proportional to the positive variations of said low voltage electrical waveform, and a second light emitting circuit means linearly responsive to negative portions of said low voltage electrical waveform for producing a second light signal, the light intensity of said second light signal being proportional to the negative variations of said low voltage electrical waveform,
(b) first and second light transmission means for transmitting said first and second light signals, and
(c) a high voltage circuit having
(i) first and second high voltage d.c. supply means
(ii) a first electronic control device connected in series with said load and said first high voltage d.c. supply means such that current may flow in a first direction through said load,
(iii) a second electronic control device connected in series with said load and said second source of high voltage d.c. supply such that current may flow in a second direction through said load, said second direction being opposite from said first direction, said first electronic control device having an electronic control element means responsive to said first light signal transmitted from said first transmission means for varying the current through said first electronic control device and said load in direct proportion to the positive variations of said low voltage electrical waveform thereby reproducing at a positive high voltage across said load the positive variations of said low voltage waveform, and said second electronic control device having an electronic control element means linearly responsive to said second light signal transmitted from said second transmission means for varying the current through said second electronic control device and said load in said second direction opposite from said first direction, in direct proportion to the negative variations of said low voltage electrical waveform thereby reproducing at a negative high voltage across said load the negative variations of said low voltage waveform.

8. A circuit arrangement for applying low frequency high voltage waveforms across a load comprising,
(a) a low voltage circuit having
(i) a signal generator for producing a low voltage electrical waveform, and
(ii) a transmitter circuit having a first and a second light emitting circuit means which generate light signals representing said low voltage electrical waveform for producing a first and a second light signal,
(b) first and second light transmission means for transmitting said first and second light signals, and
(c) a high voltage circuit having
(i) first and second high voltage d.c. supply means,
(ii) a first electronic control device connected in series with said load and said first high voltage d.c. supply means such that current may flow in a first direction through said load,
(iii) a second electronic control device connected in series with said load and said second source of high voltage d.c. supply such that current may flow in a second direction through said load, said second direction being opposite from said first direction,
said first and second electronic control devices each having an electronic control means for varying the current through said first and second electronic control devices and said load in response to said first and second light signals transmitted from said first and second transmission means to thereby regenerate said low voltage waveform at high voltage across said load.

* * * * *

UNITED STATES PATENT AND TRADEMARK OFFICE
CERTIFICATE OF CORRECTION

PATENT NO. : 4,124,886

DATED : November 7, 1978

INVENTOR(S) : Ian A. Black and Rodney Miller

It is certified that error appears in the above-identified patent and that said Letters Patent are hereby corrected as shown below:

Column 3, line 38, delete "senusoidal" and insert

--sinusoidal--

Signed and Sealed this

Twenty-ninth Day of May 1979

[SEAL]

Attest:

RUTH C. MASON
Attesting Officer

DONALD W. BANNER
Commissioner of Patents and Trademarks